United States Patent Office 3,032,538
Patented May 1, 1962

3,032,538
CROSS-LINKED CARBOXYLIC POLYMERS
David C. Spaulding, Cuyahoga Falls, and Samuel E. Horne, Jr., Akron, Ohio, assignors to The B. F. Goodrich Company, New York, N.Y., a corporation of New York
No Drawing. Filed Apr. 28, 1959, Ser. No. 809,364
11 Claims. (Cl. 260—80.3)

This invention relates to cross-linked water-swellable carboxylic polymers and more particularly pertains to interpolymers of alpha-beta olefinically unsaturated monocarboxylic acids and polyallyl tertiary amines and to the method for preparing same.

We have discovered that highly useful carboxylic polymers are obtained when a carboxylic monomer such as acrylic acid is copolymerized with certain proportions of a polyallyl tertiary amine. The resulting polymers are substantially insoluble in water and in most common organic solvents. Depending upon the particular polyallyl tertiary amine used, however, the polymers vary considerably in properties. With only 0.1 to about 15% and preferably 0.5 to 10% by weight of the polyallyl tertiary amine, insoluble gel-like polymers are obtained which, per se, and especially in the form of their alkali metal and ammonium salts, have the ability to absorb large quantities of water with consequent many times increase in volume.

The polymers embodied in the present invention somewhat resemble, but are greatly superior to, gum tragacanth, gum karaya and other naturally occurring more or less insoluble gum-like substances conventionally used as bodying and suspending agents. The high swelling polymers of this invention are extremely useful in various mucilaginous or colloidal gel-like applications such as creams, ointments, lubricants and printing paste thickeners.

In the production of the polymers of this invention we employ a monomeric mixture which contains two essential monomeric ingredients, each in certain proportions, one being a monomeric alpha-beta olefinically unsaturated monocarboxylic acid such as acrylic acid and the other being a polyallyl tertiary amine such as triallyl amine. The preferred carboxylic monomers for use in this invention are the monoolefinic acrylic acids having the general structure

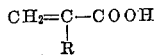

wherein R represents hydrogen, halogen, a cyano group, a hydrocarbon group having from 1 to 8 carbon atoms including monovalent alkyl radicals, monovalent aryl radicals, monovalent aralkyl radicals, monovalent alkaryl radicals and monovalent alicyclic radicals. Illustrative acrylic acids of this preferred type are acrylic acid, methacrylic acid, ethacrylic acid, alpha-chloroacrylic acid, alpha-bromoacrylic acid, alpha-cyano acrylic acid, alpha-phenyl acrylic acid, alpha-benzyl acrylic acid, alpha-cyclohexyl acrylic acid, anhydrides of the foregoing acids and others. Of this class, acrylic acid itself is most preferred because of its generally lower cost, ready availability, and ability to form superior polymers.

The polyallyl tertiary amines useful in this invention contain more than one allyl group per molecule and they conform to the structure

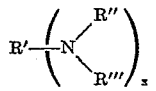

wherein $x$ is an integer of from 1 to 2 inclusive; $R'$ represents a saturated aliphatic hydrocarbon group having from 1 to 12 carbon atoms, an allyl group, and a methallyl group; and $R''$ and $R'''$ represent allyl and methallyl groups. Illustrative examples of the preferred polyallyl tertiary amines are triallyl amine, trimethallyl amine, methallyl diallyl amine, N,N,N',N'-tetraallyl ethylene diamine, N,N,N',N'-tetramethallyl ethylene diamine, N,N-diallyl N-octyl amine and the like.

The polymers of this invention preferably are prepared by polymerization in an inert diluent having some solubilizing action on one or more of the monomeric ingredients but substantially none on the resultant polymer. Polymerization in bulk may be employed, but is not preferred because of the difficulty in working up the solid polymeric masses obtained. Polymerization in an aqueous medium containing a water-soluble free-radical catalyst is useful, the product being obtained either as a granular precipitate or as a highly swollen gel, either of which may be used directly or may easily be subdivided and dried. Polymerization in an organic liquid which is a solvent for the monomers, but a non-solvent for the polymers, or in a mixture of such solvents, in the presence of a solvent soluble catalyst is most preferred because the product is usually obtained as a very fine, friable and often fluffy precipitate which, after solvent removal, seldom requires grinding or other further treatment before use. Suitable solvents for the latter method include benzene, xylene, tetralin, hexane, heptane, carbon tetrachloride, methyl chloride, ethyl chloride, bromo trichloromethane, and others, and mixtures of these and other solvents. A mixture of benzene and acetic anhydride, for example, may be used wherein the anhydride serves to dehydrate the carboxyl groups of the acid thus forming a cross-linked anhydride polymer.

Polymerization in the diluent may be carried out in the presence of a free-radical catalyst, in a closed vessel, in an inert atmosphere and under autogenous pressure or artificially induced pressure or in an open vessel under reflux at atmospheric pressure. The temperature of the polymerization may be varied from 0° C. or lower to 100° C. or higher, more preferably from 20 to 90° C., depending upon the molecular weight desired.

Suitable free-radical catalysts include peroxygen compounds such as sodium, potassium and ammonium persulfates, caprylyl peroxide, benzoyl peroxide, hydrogen peroxide, pelargonyl peroxide, cumene hydroperoxide, tertiary butyl diperphthalate, tertiary butyl perbenzoate, sodium peracetate, sodium percarbonate, and the like as well as azodiisobutyronitrile and the so-called "redox" catalysts and the heavy metal activated catalyst systems.

These high-swelling polymers generally do not attain their maximum volume in water until converted to a partial alkali, ammonium or amine salt. As the percent neutralization is increased, the ratio of volume in distilled water to unit polymer weight increases. Neutralization to the extent of 75% produces a pH of about 7.0. The neutralizing agent is preferably a mono-valent alkali such as sodium, potassium, lithium or ammonium hydroxide or the carbonates and bicarbonates thereof, or mixtures of the same, and also amine bases having not more than one primary or secondary amine group. Polyvalent bases such as calcium hydroxide, and in fact any polyvalent metal cation, have a strong deswelling action on the water-swollen polymers and their salts. It is sometimes desirable, because of the effect on the viscosity and thixotropy of the water-swollen gels, however, to neutralize the polymer with up to 25% of a polyvalent metal base such as calcium hydroxide and the like.

In the following illustrative examples the amounts of ingredients are expressed in parts by weight unless otherwise indicated and the viscosities were determined with a Brookfield viscometer and the values are given in centipoises.

Example I

A number of acrylic acid-triallylamine copolymers were prepared at 50° C. in a nitrogen atmosphere from the following recipe. The polymerization reaction time was 24 hours in each case.

| | |
|---|---:|
| Glacial acrylic acid | 100 |
| Triallylamine | Variable |
| Benzene | 880 |
| Azobisisobutyronitrile | 2.0 |

The yields of white, fluffy insoluble polymer were quantitative. Aqueous mucilages were prepared from 1.5 g. of each dried polymer, 88 g. of distilled water and 12 cc. of 5% aqueous sodium hydroxide. The mucilages were allowed to swell overnight and the Brookfield viscosities listed in the table below were then determined at various polymer concentrations

| Triallylamine | Viscosity at Various Polymer Concentrations | | | | |
|---|---|---|---|---|---|
| | 1.5% | 1.0% | 0.5% | 0.125% | 0.0625% |
| 0.5 | 600 | 400 | 200 | 80 | 40 |
| 1.0 | 1,400 | 860 | 440 | 120 | 80 |
| 2.0 | 4,440 | 2,720 | 1,400 | 340 | 160 |
| 5.0 | 34,600 | 20,000 | 8,000 | 720 | 180 |
| 7.5 | 94,400 | 50,000 | 16,800 | 400 | 80 |
| 10.0 | 120,000 | 54,000 | 13,600 | 140 | |
| 15.0 | 80,000 | 42,000 | 4,400 | | |

The polymer containing 2% triallylamine permanently suspended fine sand at 0.125% polymer concentration in water. All of the above polymers were found to be excellent thickeners for latex paints. Acrylic acid-trimethallyl amine copolymers of the above type were equally effective thickeners for water at pH of about 7.

A polymerization recipe charged with 100 parts glacial acrylic acid, 2 parts diallyl aniline, 880 parts of benzene and 2 parts of azobisisobutyronitrile treated in the above-described manner produced a polymer which did not thicken water measurably at 1.5% polymer concentration and neutralized to a pH of 7 with sodium hydroxide. A copolymer of 100 parts of acrylic acid and 1.5 parts of diallylamine prepared in the same way was completely ineffective in thickening water.

Example II

A copolymer of 100 parts of glacial acrylic acid and 2 parts of N,N,N',N'-tetraallyl ethylene diamine was prepared by the procedure of Example I. Aqueous mucilages of this polymer were prepared at pH of about 7. The mucilage viscosities were 3,340 cps. at 1.5% polymer concentration, 2,060 cps. at 1.0% concentration, 760 cps. at 0.5% concentration and 40 cps. at 0.0625% concentration.

Example III

Polymers were prepared by the procedure described in Example I from the following recipe:

| | |
|---|---:|
| Glacial acrylic acid | 100 |
| Acetic anhydride | 170 |
| Triallylamine | Variable |
| Benzene | 880 |
| Catalyst | 2.0 |

The aqueous mucilages listed in the following table were prepared at a pH of about 7.

| Catalyst | Triallyl Amine | Aqueous Viscosity at Various Polymer Concentrations | | | | |
|---|---|---|---|---|---|---|
| | | 1.5% | 1.0% | 0.5% | 0.125% | 0.0625% |
| azobisisobutyro-nitrile | 0.75 | 13,600 | 7,600 | 3,680 | 620 | 160 |
| Do | 1.0 | 52,800 | 34,000 | 12,600 | 600 | 40 |
| benoylperoxide | 1.0 | 176,000 | 86,400 | 37,200 | 1,280 | 100 |
| Do | 1.5 | 96,000 | 54,400 | 16,800 | 180 | 20 |
| Do | 2.0 | 112,000 | 50,000 | 7,720 | 20 | |
| Do | 5.0 | 44,000 | 6,000 | 480 | | |
| Do | 7.5 | 20,000 | 5,000 | 280 | | |
| Do | 10 | 10,400 | 2,440 | 140 | | |

A polymerization recipe of the above type charged with two parts of benzoylperoxide and two parts of N,N,N',N'-tetraallyl ethylene diamine in place of triallylamine resulted in a polymer which had aqueous pH 7 viscosities of 23,200 cps. at 1.5% polymer concentration, 5,080 cps. at 1.0% polymer concentration and 580 cps. at 0.5% polymer concentration. The replacement of triallyl amine with N-octyl N,N-diallyl amine in the above recipe gave comparable results.

Example IV

Copolymers of glacial methacrylic acid and of N,N,-N',N'-tetraallyl ethylene diamine were prepared according to the procedure set forth in Example I. The polymer prepared with 2 parts of N,N,N',N'-tetraallyl ethylene diamine had aqueous mucilage viscosities at pH about 7 of 400 cps. at 1.5% polymer concentration, 240 cps. at 1% polymer concentration and 20 cps. at 0.0625% polymer concentration and polymers containing other levels of cross-linking were comparable to the cross-linked acrylic acid copolymers described in Example I.

We claim:

1. The water-swellable, resinous copolymer of an alpha-beta olefinically unsaturated monocarboxylic acid conforming to the structure

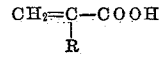

wherein R is a member of the class consisting of hydrogen and a hydrocarbon group having from 1 to 8 carbon atoms and from 0.1 to 15 parts by weight based on the weight of said acid of a compound conforming to the structure

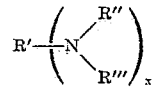

wherein x is an integer of from 1 to 2, inclusive, R' is a member of the class consisting of a saturated aliphatic hydrocarbon group having from 1 to 12 carbon atoms, allyl groups and methallyl groups, R'' is a member of the class consisting of allyl and methallyl groups and R''' is a member of the class consisting of allyl and methallyl groups, said copolymer having a viscosity of at least 240 centipoises at 1% by weight concentration in distilled water at a pH of about 7.

2. The water-swellable, resinous copolymer of acrylic acid and from 0.5 to 10% by weight based on the weight of said acid of a compound conforming to the structure

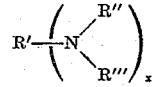

wherein $x$ is an integer of from 1 to 2, inclusive, R' is a member of the class consisting of a saturated aliphatic hydrocarbon group having from 1 to 12 carbon atoms, allyl groups and methallyl groups, R'' is a member of the class consisting of allyl and methallyl groups and R''' is a member of the class consisting of allyl and methallyl groups, said copolymer having a viscosity of at least 240 centipoises at 1% by weight concentration in distilled water at a pH of about 7.

3. The water-swellable, resinous copolymer of acrylic acid and from 0.5 to 10 parts by weight based on the weight of said acid of triallylamine, said copolymer having a viscosity of at least 240 centipoises at 1% by weight concentration in distilled water at a pH of about 7.

4. The water-swellable, resinous copolymer of acrylic acid and from 0.5 to 10 parts by weight based on the weight of said acid of N,N,N',N'-tetraallyl ethylene diamine, said copolymer having a viscosity of at least 240 centipoises at 1% by weight concentration in distilled water at a pH of about 7.

5. The water-swellable, resinous copolymer of acrylic acid and from 0.5 to 10 parts by weight based on the weight of said acid of N-octyl, N,N-diallyl amine, said copolymer having a viscosity of at least 240 centipoises at 1% by weight concentration in distilled water at a pH of about 7.

6. The water-swellable, resinous copolymer of methacrylic acid and from 0.5 to 10 parts by weight based on the weight of said acid of N,N,N',N'-tetraallyl ethylene diamine, said copolymer having a viscosity of at least 240 centipoises at 1% by weight concentration in distilled water at a pH of about 7.

7. The method for preparing the water-swellable, resinous copolymer of an alpha-beta olefinically unsaturated monocarboxylic acid having from 3 to 4 carbon atoms and having terminal olefinic unsaturation and from 0.1 to 15 parts by weight based on the weight of said acid of a compound conforming to the structure

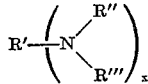

wherein $x$ is an integer of from 1 to 2, inclusive, $R'$ is a member of the class consisting of a saturated aliphatic hydrocarbon group having from 1 to 12 carbon atoms, allyl groups and methallyl groups, $R''$ is a member of the class consisting of allyl and methallyl groups and $R'''$ is a member of the class consisting of allyl and methallyl groups, said copolymer having a viscosity of at least 240 centipoises at 1% by weight concentration in distilled water at a pH of about 7, said method comprising concluding the polymerization in a liquid organic diluent at from 20° C. to 90° C. in an inert atmosphere in the presence of a free-radical initiator.

8. The method for preparing the water-swellable, resinous copolymer of an alpha-beta olefinically unsaturated monocarboxylic acid conforming to the structure

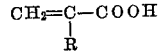

wherein R is a member of the class consisting of hydrogen and a hydrocarbon group having from 1 to 8 carbon atoms and from 0.1 to 15 parts by weight based on the weight of said acid of a compound conforming to the structure

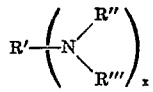

wherein $x$ is an integer of from 1 to 2, inclusive, $R'$ is a member of the class consisting of a saturated aliphatic hydrocarbon group having from 1 to 12 carbon atoms, allyl groups and methallyl groups, $R''$ is a member of the class consisting of allyl and methallyl groups and $R'''$ is a member of the class consisting of allyl and methallyl groups, said copolymer having a viscosity of at least 240 centipoises at 1% by weight concentration in distilled water at a pH of about 7, said method comprising conducting the polymerization in a liquid organic diluent at from 20° C. to 90° C. in an inert atmosphere in the presence of a free-radical initiator.

9. The method of claim 8 wherein the liquid organic diluent is a liquid aromatic hydrocarbon.

10. The method of claim 9 wherein the liquid hydrocarbon is benzene.

11. The method of claim 8 wherein the unsaturated monocarboxylic acid is acrylic acid and the liquid organic diluent is a mixture of acetic anhydride and benzene.

References Cited in the file of this patent

UNITED STATES PATENTS

| | | |
|---|---|---|
| 2,216,548 | Converse | Oct. 1, 1940 |
| 2,550,652 | Drechsel et al. | Aug. 24, 1951 |
| 2,592,107 | Azorlosa | Apr. 8, 1952 |
| 2,628,221 | Marsh | Apr. 10, 1953 |
| 2,628,224 | LeSuer et al. | Feb. 10, 1953 |
| 2,662,875 | Chaney | Dec. 15, 1953 |
| 2,662,877 | Chaney | Dec. 15, 1953 |
| 2,801,985 | Roth | Aug. 6, 1957 |
| 2,810,716 | Markus | Oct. 22, 1957 |
| 2,840,550 | Price et al. | June 24, 1958 |
| 2,923,701 | Schuller | Feb. 2, 1960 |
| 2,980,655 | Glass et al. | Aug. 18, 1961 |

OTHER REFERENCES

Butler et al.: Journal of the American Chemical Society, vol. 71, pages 3120–3122 (1949). (Copy in Sci. Lib.)

Butler et al.: Ibid., vol. 76, pages 2418–2421 (1954). (Copy in Sci. Lib.)

Butler et al.: Journal of the American Chem. Soc., vol. 74, page 3453 (1952). (Copy in Sci. Lib.)

Jones: Journal of Polymer Science, "Letters to the Editor," vol. XXV, #109, pages 237–239 (1957). (Copy in Sci. Lib.)

UNITED STATES PATENT OFFICE

CERTIFICATE OF CORRECTION

Patent No. 3,032,538            May 1, 1962

David C. Spaulding et al.

It is hereby certified that error appears in the above numbered patent requiring correction and that the said Letters Patent should read as corrected below.

Column 3, in the table of Example III, first column, line 3 thereof, for "benoylperoxide" read -- benzoylperoxide --; same table, first column, line 5 thereof, for "Do." read -- azobisisobutyronitrile --; column 6, line 34, for "LeSuer et al." read -- Cairns et al. --.

Signed and sealed this 19th day of March 1963.

(SEAL)
Attest:

ESTON G. JOHNSON

Attesting Officer

DAVID L. LADD

Commissioner of Patents